(12) United States Patent
Huang

(10) Patent No.: US 11,231,792 B1
(45) Date of Patent: Jan. 25, 2022

(54) COMPUTER MOUSE

(71) Applicant: COMPUCASE ENTERPRISE CO., LTD., Tainan (TW)

(72) Inventor: Li-Chun Huang, Tainan (TW)

(73) Assignee: COMPUCASE ENTERPRISE CO., LTD., Tainan (TW)

( * ) Notice: Subject to any disclaimer, the term of this patent is extended or adjusted under 35 U.S.C. 154(b) by 0 days.

(21) Appl. No.: 17/204,323

(22) Filed: Mar. 17, 2021

(30) Foreign Application Priority Data

Jul. 21, 2020 (TW) ................................ 109124631

(51) Int. Cl.
*G06F 3/0354* (2013.01)
(52) U.S. Cl.
CPC .. *G06F 3/03543* (2013.01); *G06F 2203/0333* (2013.01)
(58) Field of Classification Search
CPC ................ G06F 3/03543; G06F 2203/0333

USPC ........................................................ 345/163
See application file for complete search history.

(56) References Cited

U.S. PATENT DOCUMENTS

| 2015/0022451 A1* | 1/2015 | Drougge | G06F 3/03543 |
| | | | 345/163 |
| 2015/0138092 A1* | 5/2015 | Lo | G06F 3/03543 |
| | | | 345/163 |

* cited by examiner

*Primary Examiner* — Mark Edwards
(74) *Attorney, Agent, or Firm* — Muncy, Geissler, Olds & Lowe, P.C.

(57) ABSTRACT

A computer mouse includes a base unit, a button unit, and a fastening unit. The button unit is pivotally mounted to the base unit via a front part of the button unit, and is able to be actuated to allow a rear part of the button unit to substantially pivot in an up-down direction relative to the base unit. The fastening unit is disposed between the base unit and the button unit, and is operable to position the button unit relative to the base unit.

10 Claims, 8 Drawing Sheets

COMPUTER MOUSE

CROSS-REFERENCE TO RELATED APPLICATION

This application claims priority to Taiwanese Invention Patent Application No. 109124631, filed on Jul. 21, 2020.

FIELD

The disclosure relates to a computer device, and more particularly to a computer mouse.

BACKGROUND

A conventional computer mouse includes a button part and a supporting part that are respectively disposed at front and rear sides of the conventional computer mouse. The button part includes a plurality of buttons for a user to click and a scroll wheel operable by fingers. The supporting part provides support for a palm of the user's hand that is used to hold or grip the conventional computer mouse, and the supporting part cooperates with the button part to form an arc-shaped surface that the palm can be placed on.

However, the arc-shaped surface of the conventional computer mouse has a specific profile that cannot be adjusted according to individual requirements (e.g. different palm sizes or hand profiles of users). Long-term use of the conventional computer mouse that does not fit the palm size or the hand profile may cause the user discomfort, increased stress and strain, and even chronic injury to the user's hand.

SUMMARY

Therefore, an object of the disclosure is to provide a computer mouse that can alleviate at least one of the drawbacks of the prior art.

According to the disclosure, the computer mouse includes a base unit, a button unit, and a fastening unit. The button unit is pivotally mounted to the base unit via a front part of the button unit, and is able to be actuated to allow a rear part of the button unit to substantially pivot in an up-down direction relative to the base unit. The fastening unit is disposed between the base unit and the button unit, and is operable to position the button unit relative to the base unit.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
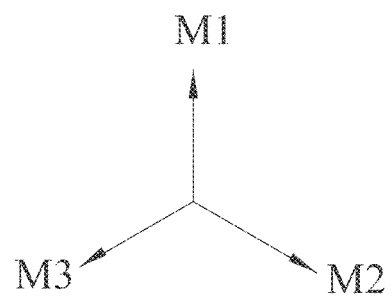
FIG. 1 is a perspective view illustrating an embodiment of a computer mouse according to the disclosure.
Figure 1:
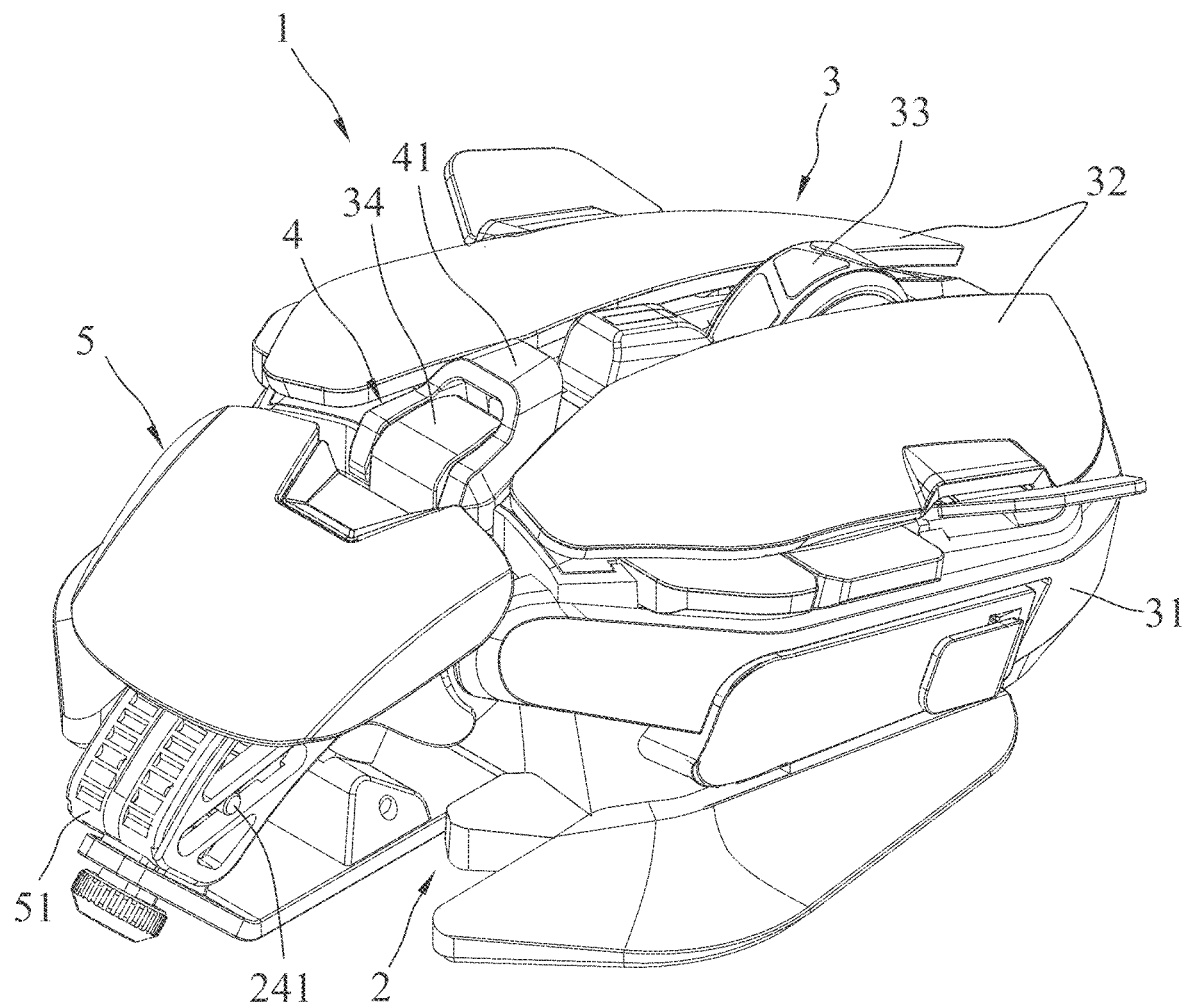
Figure 2:
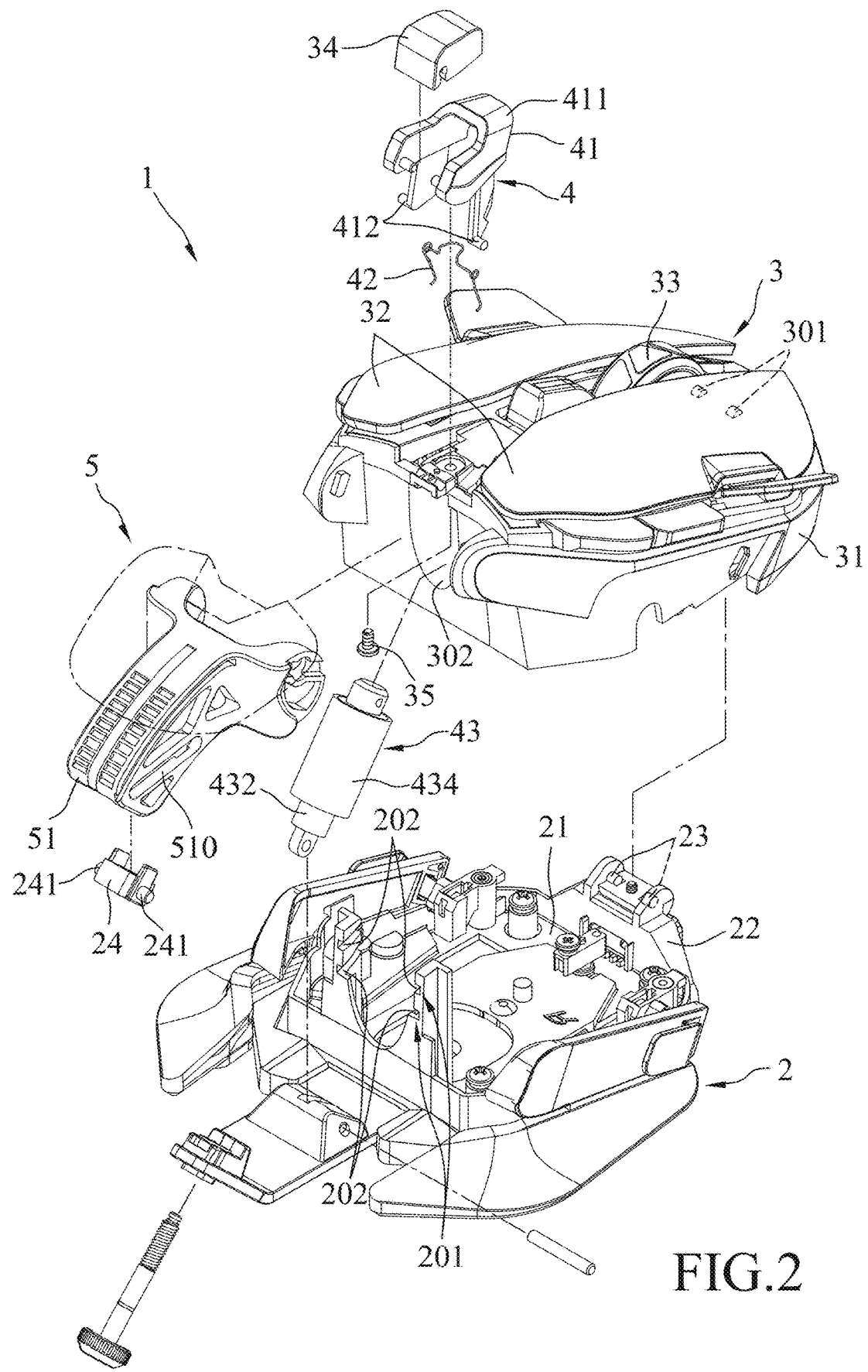
FIG. 2 is an exploded perspective view illustrating the embodiment.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 to 4, an embodiment of a computer mouse 1 according to the disclosure includes a base unit 2, a button unit 3 that is disposed on the base unit 2, a fastening unit 4 that is disposed between the base unit 2 and the button unit 3, and a supporting unit 5 that is disposed on the base unit 2.

The base unit 2 includes a bottom wall 21, a surrounding wall 22 that extends upwardly from the bottom wall 21, and a connecting member 24 that is mounted to a rear part of the bottom wall 21 and that extends toward the supporting unit 5. A front part of the surrounding wall 22 is provided with two pivoting protrusions 23 that are spaced apart from each other, that are arranged in a left-right direction (M2), and that extend toward each other. A rear part of the surrounding wall 22 is provided with two positioning sets 201 that are substantially spaced apart from each other in an up-down direction (M1). Each of the positioning sets 201 has two slots 202 that are spaced apart from each other in the left-right direction (M2), that are arc-shaped, and that substantially extend in a front-rear direction (M3). The connecting member 24 has two protrusions 241 that are arranged in the left-right direction (M2) and that extend away from each other.

The button unit 3 is pivotally mounted on a front part of the base unit 2 via a front part of the button unit 3. The button unit 3 includes a mounting base 31, a plurality of buttons 32, a scroll wheel 33, a fixing member 34, and an abutting member 35. A front part of the mounting base 31 is provided with two pivoting grooves 301 that are spaced apart from each other in the left-right direction (M2), and a rear part of the mounting base 31 is provided with a mounting groove 302 that substantially extends in the front-rear direction (M3) and that has an incline substantially slanting downwardly. The mounting base 31 surrounds the surrounding wall 22 of the base unit 2 and is mounted to the surrounding wall 22 with the pivoting grooves 301 that are pivotally connected to the pivoting protrusions 23 of the surrounding wall 22 of the base unit 2, so that the mounting base 31 can substantially pivot in the up-down direction (M1) relative to the surrounding wall 22. The buttons 32 and the scroll wheel 33 are disposed on the mounting base 31 and are adapted for being pressed, clicked, or rolled. The fixing member 34 and the abutting member 35 are respectively disposed at upper and lower sides of the rear part of the mounting base 31. The abutting member 35 protrudes through the rear part of the mounting base 31 upwardly such that the abutting member 35 is in screw connection with the fixing member 34.

Figure 4:
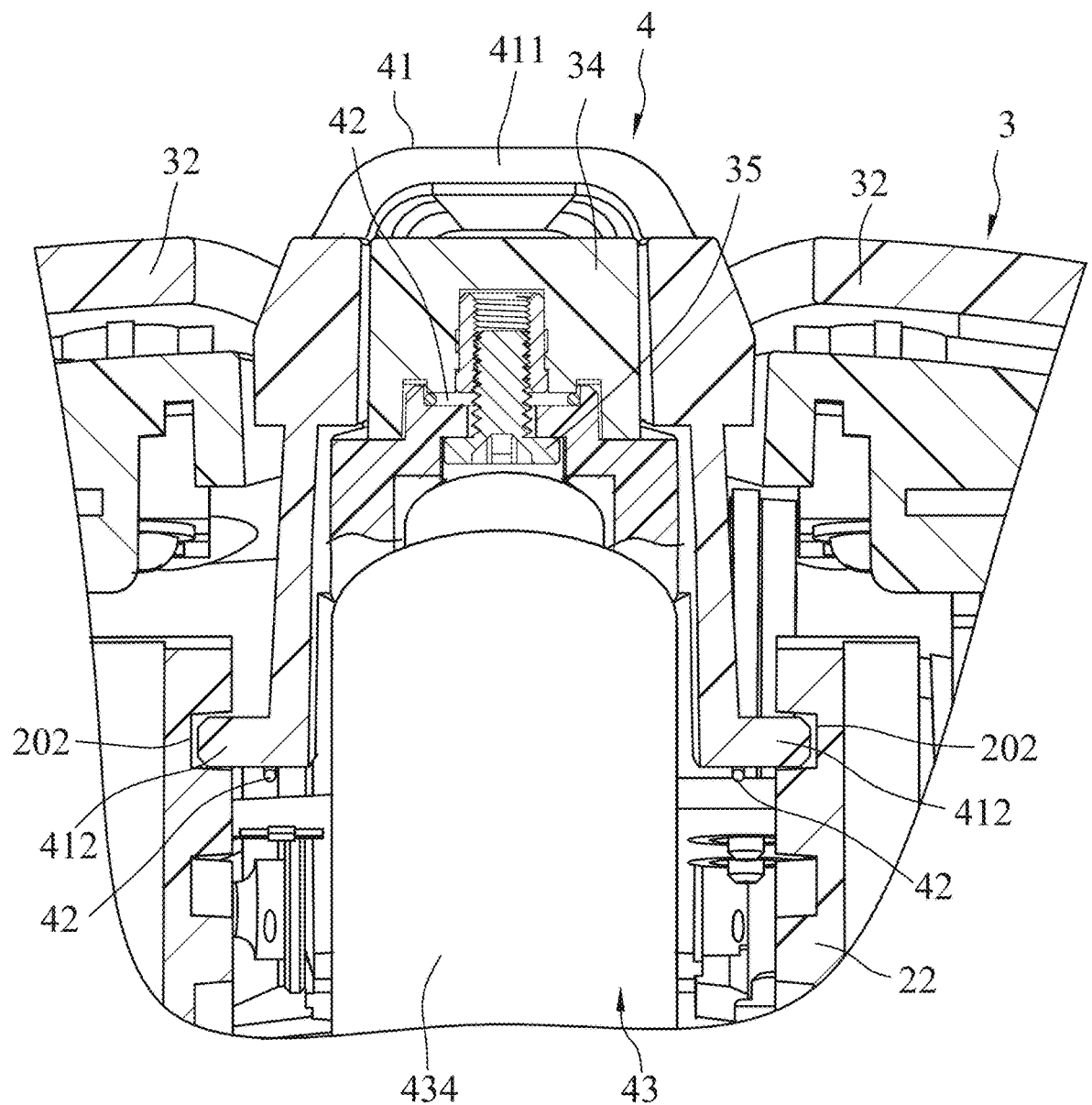
FIG. 4 is a fragmentary sectional rear view illustrating the fastening unit being engaged with an upper positioning set.
Figure 5:
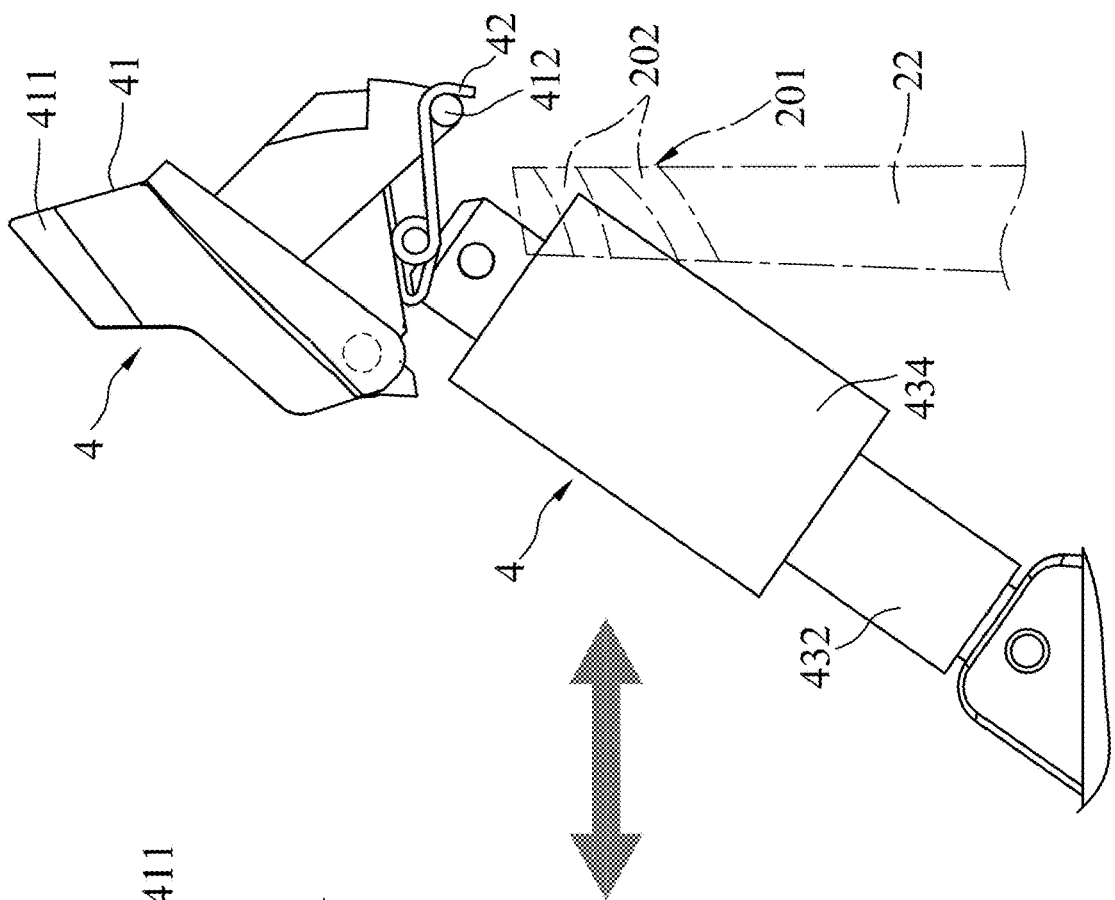
FIG. 5 illustrates the fastening unit being operable to position a button unit relative to a base unit.
Figure 5:
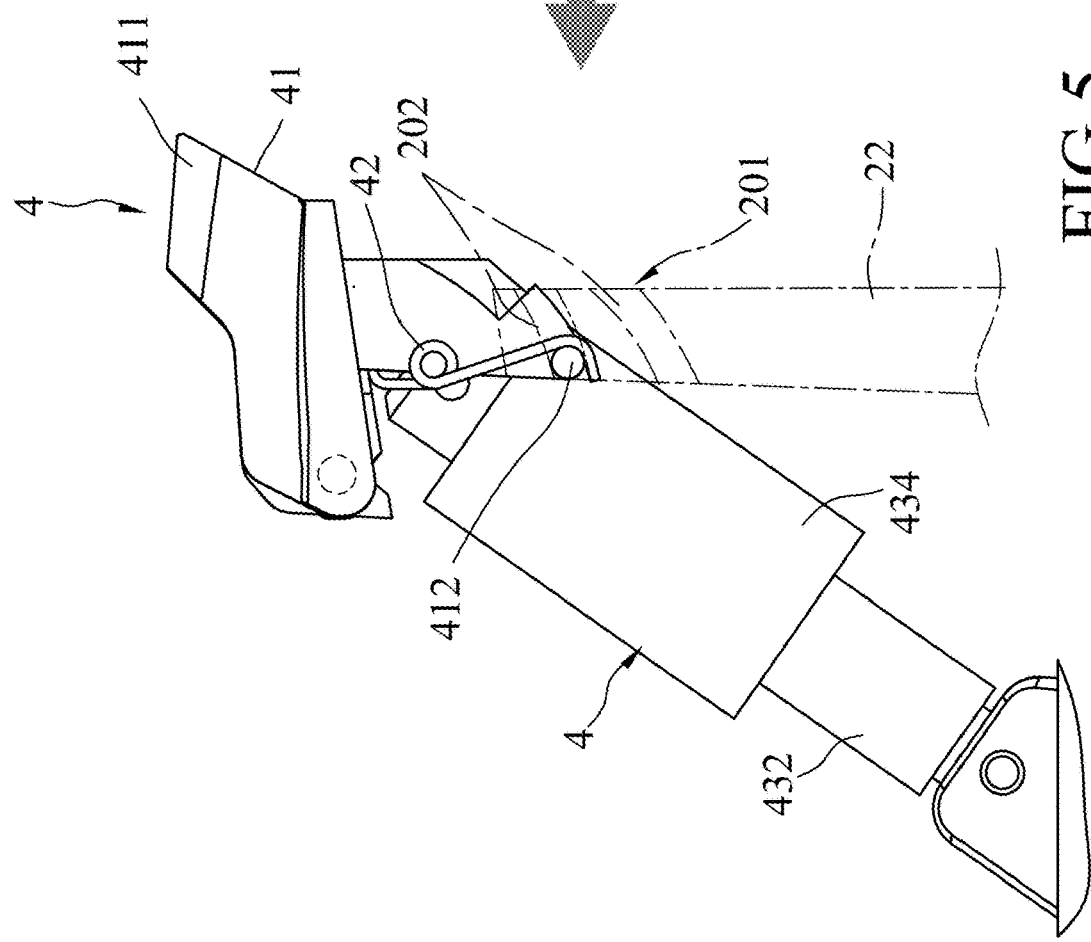

The fastening unit 4 includes an actuating member 41, a restoring member 42, and a strut assembly 43. The actuating member 41 is pivotally mounted to the fixing member 34 of the button unit 3 in the left-right direction (M2) and can substantially pivot in the up-down direction (M1) relative to the mounting base 31 of the button unit 3. The strut assembly 43 is disposed between the bottom wall 21 of the base unit 2 and the abutting member 35 of the button unit 3, and is telescopic and resiliently biases the bottom wall 21 and the abutting member 35 away from each other. The actuating member 41 has an operating part 411 that is pivotally connected to the fixing member 34 of the button unit 3 about an axis that extends in the left-right direction (M2), and two fastening parts 412 that extend away from each other and outward from the operating part 411 in the left-right direction (M2). The actuating member 41 is operable to separably engage the slots 202 of a selected one of the positioning sets 201 of the base unit 2 through the fastening parts 412 so as to position the button unit 3 relative to the base unit 2. In FIG. 4, the fastening parts 412 respectively and separably engage the slots 202 of the upper positioning set 201. The operating part 411 is able to be pulled to drive the fastening parts 412 to move forwardly so that the fastening parts 412 are disengaged from the slots 202.

The restoring member 42 is connected between the fastening parts 412 and the mounting base 31 of the button unit 3. The restoring member 42 has two ends that respectively and substantially extend downwardly and that are respectively bent into hook shapes which substantially and respectively curve along the fastening parts 412 rearwardly. Besides, the restoring member 42 constantly provides a restoring force for the fastening parts 412 to move toward the slots 202.

Figure 3:
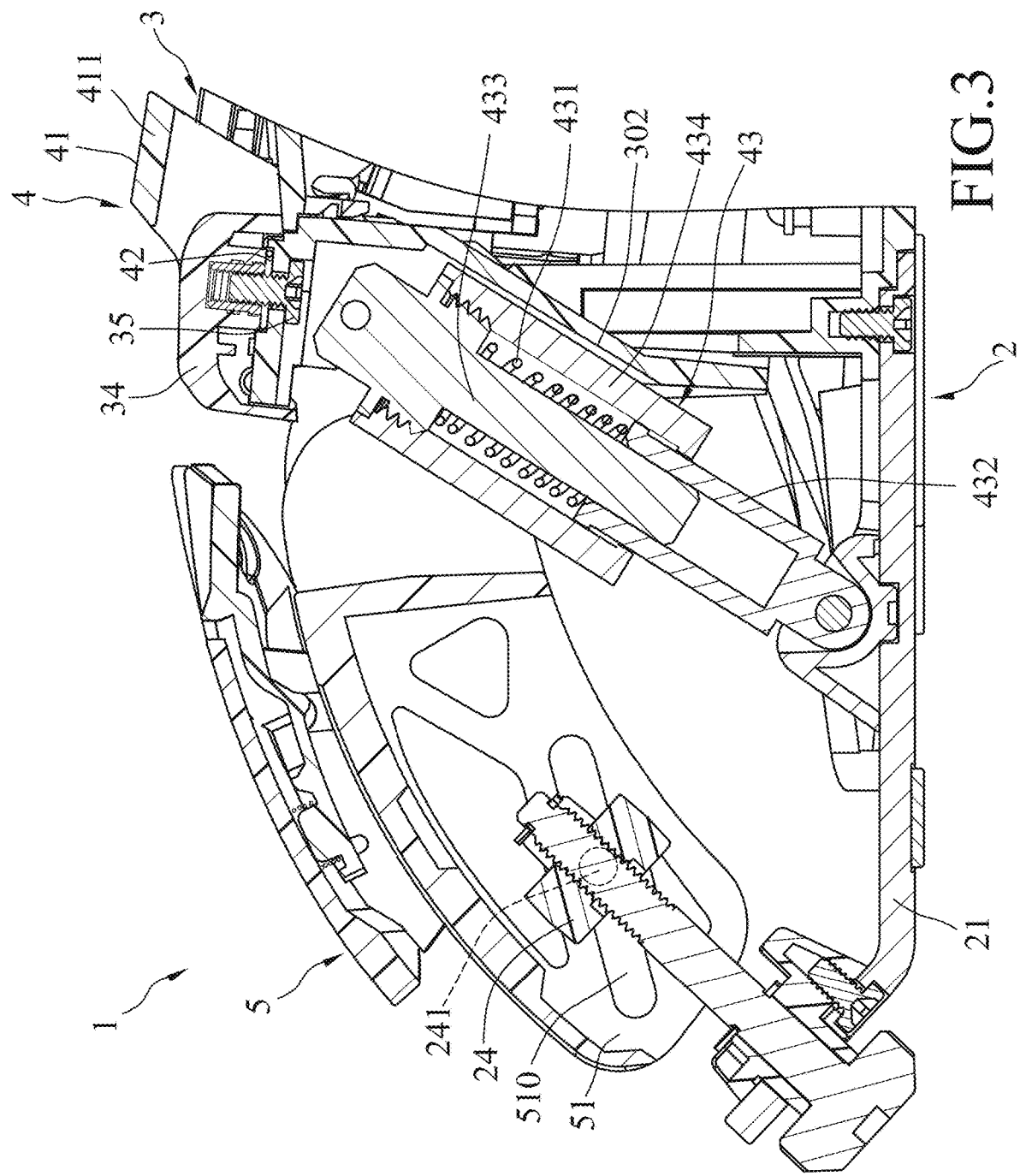
FIG. 3 is a fragmentary sectional side view illustrating a fastening unit and a supporting unit of the embodiment.
Figure 6:
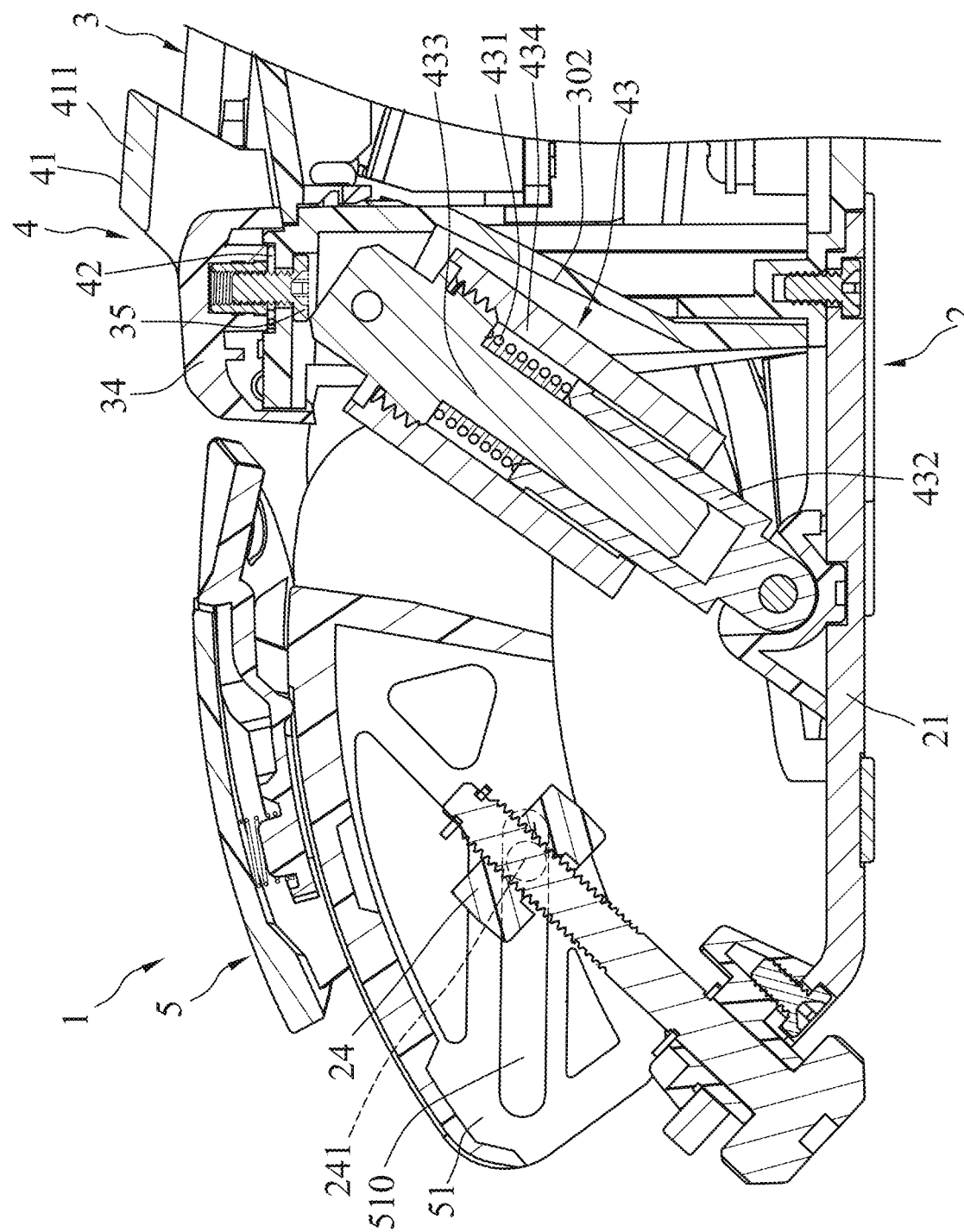
FIG. 6 is another fragmentary sectional side view illustrating the fastening unit and the supporting unit of the embodiment.
Figure 7:
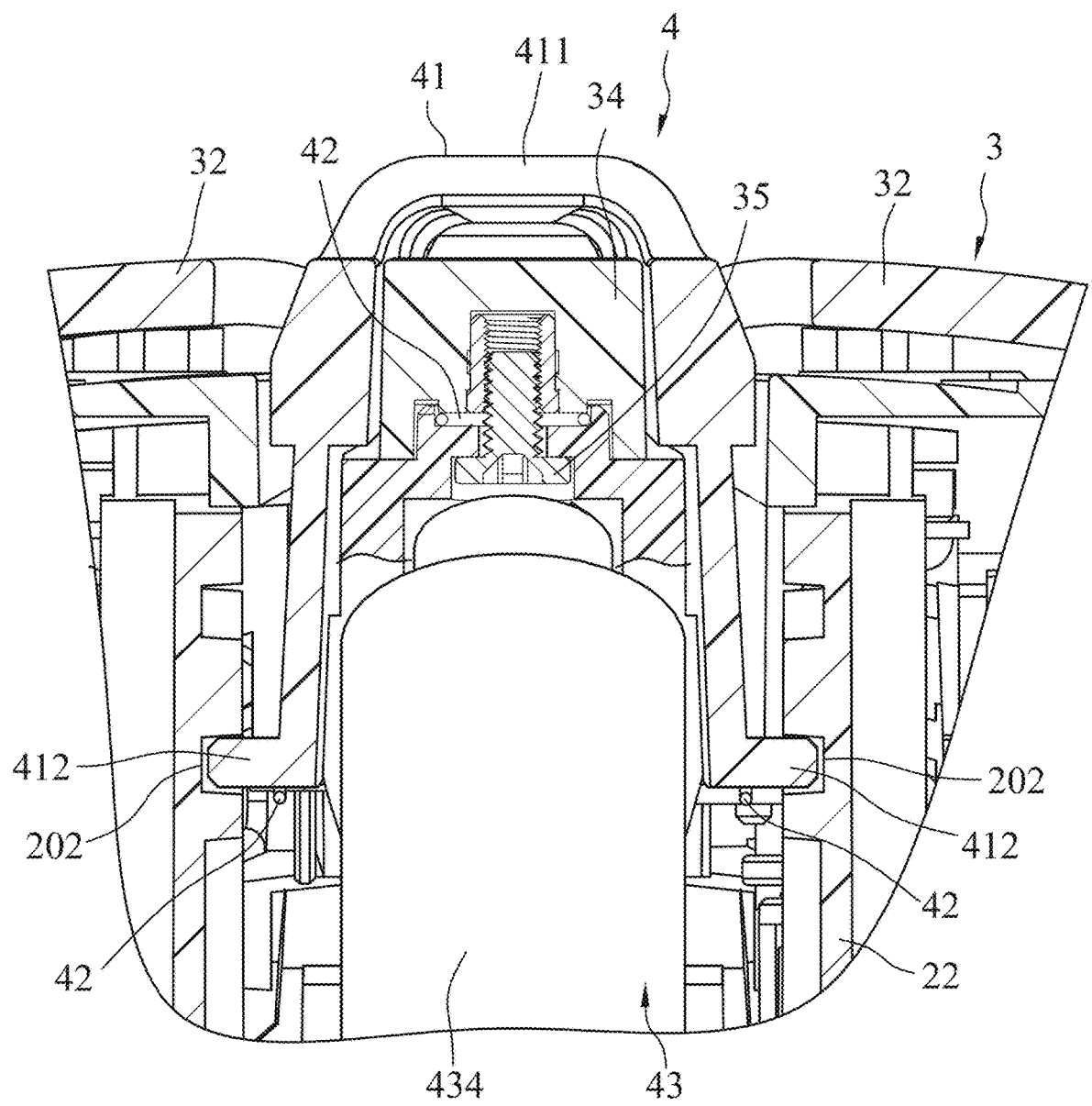
FIG. 7 is a fragmentary sectional rear view illustrating the fastening unit being engaged with a lower positioning set.
Figure 8:
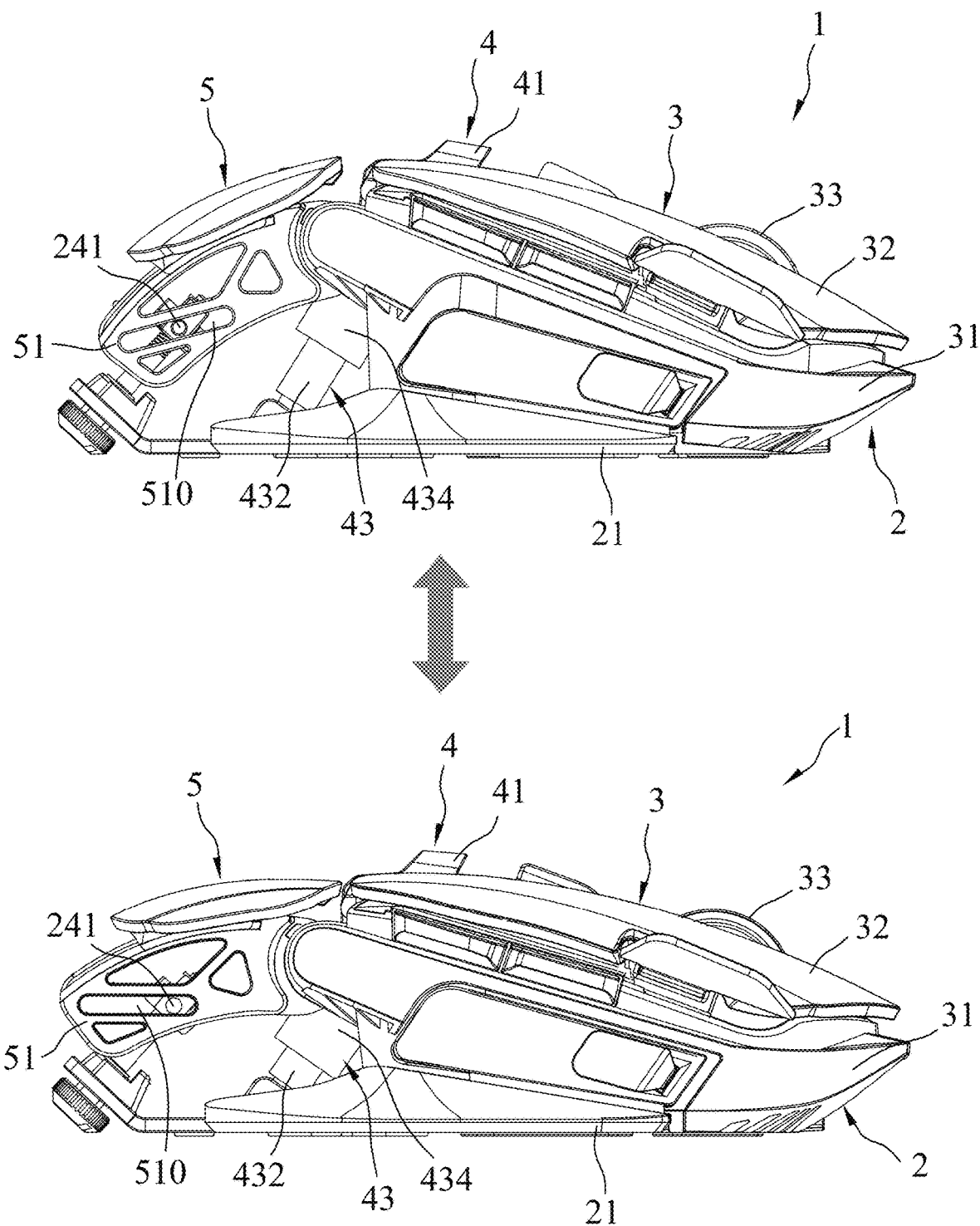
FIG. 8 illustrates the button unit being able to substantially pivot in an up-down direction relative to the base unit.

The strut assembly 43 is disposed in the mounting groove 302 of the mounting base 31 of the button unit 3, substantially extends in the front-rear direction (M3) along the mounting groove 302, and has an incline that substantially slants downwardly along the mounting groove 302. The strut assembly 43 includes a mounted tube 432 that is mounted to the bottom wall 21 of the base unit 2, a moving rod 433 that is telescopically connected to the mounted tube 432, an elastic member 431 that has two opposite ends respectively connected to the mounted tube 432 and the moving rod 433, and a casing tube 434 that is connected to an upper part of the moving rod 433 and that synchronously moves with the moving rod 433 substantially in the up-down direction (M1). As shown in FIG. 3 and FIG. 6, when the mounting base 31 of the button unit 3 pivots downwardly relative to the base unit 2, the abutting member 35 of the button unit 3 moves downwardly to push the moving rod 433 to move substantially downwardly toward the mounted tube 432. The elastic member 431 resiliently biases the moving rod 433 to move substantially upwardly from the mounted tube 432 so that the moving rod 433 resiliently biases the button unit 3 away from the base unit 2. The casing tube 434 has an incline that substantially slants downwardly, surrounds both of the elastic member 431 and the moving rod 433, and substantially extends along the moving rod 433. In addition, a lower part of the casing tube 434 is in movable contact with and surrounds an upper part of the mounted tube 432.

Referring to FIGS. 1, 2, 3 and 6, the supporting unit 5 is disposed on a rear part of the base unit 2 and is pivotally connected to a rear part of the button unit 3 about another axis that extends in the left-right direction (M2) so that the supporting unit 5 can synchronously move with the button unit 3 substantially in the up-down direction (M1). The supporting unit 5 includes a sliding member 51 that extends toward the bottom wall 21 of the base unit 2. The sliding member 51 is provided with two sliding grooves 510 that are spaced apart from each other in the left-right direction (M2), that substantially extend in the front-rear direction (M3), and that are respectively for the protrusions 241 of the connecting member 24 of the base unit 2 to slidably engage.

Referring to FIGS. 5 to 8, when positioning the button unit 3 relative to the base unit 2 at a position that is lower than the initial position (see FIG. 4), the operating part 411 of the actuating member 41 of the fastening unit 4 has to be pulled upwardly to drive the fastening parts 412 of the actuating member 41 of the fastening unit 4 to move forwardly so that the fastening parts 412 are respectively disengaged from the slots 202 of the upper positioning set 201 of the base unit 2. On the other hand, when the button unit 3 is pressed downwardly, the button unit 3 substantially pivots downwardly relative to the base unit 2 and therefore urges the abutting member 35 of the button unit 3 to push the moving rod 433 of the strut assembly 43 of the fastening unit 4 downwardly. As a result, the moving rod 433 moves toward the mounted tube 432 of the strut assembly 43 of the fastening unit 4, and the elastic member 431 of the strut assembly 43 of the fastening unit 4 is compressed by the moving rod 433 and the mounted tube 432 accordingly.

Since the sliding member 51 of the supporting unit 5 is provided with the sliding grooves 510 that are respectively for the protrusions 241 of the connecting member 24 of the base unit 2 to slidably engage, and since the supporting unit 5 can synchronously move with the button unit 3 substantially in the up-down direction (M1), the supporting unit 5 is able to be driven to substantially slide rearwardly and downwardly relative to the connecting member 24 when the mounting base 31 of the button unit 3 substantially pivots downwardly relative to the base unit 2. When a bottom edge of the mounting base 31 reaches the bottom wall 21 of the base unit 2, the pivoting movement of the mounting base 31 that is downward relative to the base unit 2 is thus stopped by the bottom wall 21, and the fastening parts 412 of the actuating member 41 of the fastening unit 4 reaches a position where the fastening parts 412 are able to respectively and separably engage the slots 202 of the lower positioning set 201 of the base unit 2. At this time, the fastening parts 412 will move toward, and respectively and separably engage the slots 202 of the lower positioning set 201 by the restoring force that is constantly provided by the restoring member 42 of the fastening unit 4 when the operating part 411 of the actuating member 41 of the fastening unit 4 is released from being pulled. As a result, the button unit 3 of the computer mouse 1 is positioned at the lower position relative to the base unit 2.

On the other hand, when positioning the button unit 3 relative to the base unit 2 back to the initial position, the operating part 411 of the actuating member 41 of the fastening unit 4 has to be pulled upwardly to drive the fastening parts 412 of the actuating member 41 of the fastening unit 4 to move forwardly so that the fastening parts 412 are disengaged from the slots 202 of the lower positioning set 201 of the base unit 2. Then, the elastic member 431 of the strut assembly 43 of the fastening unit 4 biases the moving rod 433 of the strut assembly 43 of the fastening unit 4 to move substantially upwardly from the mounted tube 432 of the strut assembly 43 of the fastening unit 4 such that the moving rod 433 upwardly urges the abutting member 35 of the button unit 3 and biases the mounting base 31 of the button unit 3 away from the base unit 2. The supporting unit 5 is thus driven to synchronously move with the button unit and substantially slide forwardly and upwardly relative to the connecting member 24 of the base unit 2. At this time, the operating part 411 is stopped from being pulled when the fastening parts 412 reaches a position where the fastening parts 412 are able to respectively and separably engage the slots 202 of the upper positioning set 201 of the base unit 2, so that the fastening parts 412 can move toward, and respectively and separably engage the slots 202 of the upper positioning set 201 by the restoring force that is constantly provided by the restoring member 42 of the fastening unit 4. As a result, the button unit 3 of the computer mouse 1 is positioned at an upper position relative to the base unit 2, also referred to as the initial position.

In this embodiment, there are two positioning sets 201 of the base unit 2 of the computer mouse 1, but the computer mouse 1 with at least three positioning sets 201 can also be practiced.

In addition, functions of the fastening unit 4 in this embodiment are designed that the strut assembly 43 of the fastening unit 4 is telescopic and resiliently biases the base unit 2 and the button unit 3 away from each other, and that the button unit 3 can be positioned relative to the base unit 2 by an arrangement of the actuating member 41 and the restoring member 42 of the fastening unit 4. However, other ways for the fastening unit 4 to bias the base unit 2 and the button unit 3 away from each other, and other applicable positions of the button unit 3 relative to the base unit 2, can also be practiced. For example, the fastening unit 4 can be a pneumatic cylinder that is disposed between the base unit 2 and the button unit 3. However, since the pneumatic cylinder to bias and position the objects is well-understood by those skilled in the art, there will be no further detail described for the pneumatic cylinder.

In summary, an advantage of the computer mouse 1 is that the computer mouse 1 can be adjusted according to individual requirements (e.g. different palm sizes or different hand profiles of users) by positioning the button unit 3 relative to the base unit 2. The advantage can be achieved by disengaging the fastening unit 4 from the one of the positioning sets 201 of the base unit 2 that the fastening unit 4 engages, pressing or releasing the button unit 3 that is resiliently biased away from the base unit 2 by the moving rod 433 which is resiliently biased by the elastic member 431 of the strut assembly 43 of the fastening unit 4, and then engaging the fastening unit 4 to the selected one of the positioning sets 201 that meets the individual requirements. Therefore, with such advantage, the computer mouse 1 can provide a comfortable grip and support to the user's hand that is used to operate the computer mouse 1. Even with repetitive or long-term use of the computer mouse 1, the computer mouse 1 does not injure the hand, or increase stress and strain on the hand like a conventional computer mouse does. Furthermore, it is easy to adjust the computer mouse 1 according to the individual requirements. Thus, the computer mouse 1 is ergonomic and user-friendly.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A computer mouse comprising:
   a base unit;
   a button unit pivotally mounted to said base unit via a front part of said button unit, and being able to be actuated to allow a rear part of said button unit to substantially pivot in an up-down direction relative to said base unit; and
   a fastening unit disposed between said base unit and said button unit, and operable to position said button unit relative to said base unit;
   wherein said base unit includes a plurality of positioning sets that are substantially spaced apart from each other in the up-down direction, said fastening unit including an actuating member that is pivotally mounted to said button unit and that is operable to separably engage a selected one of said positioning sets so as to position said button unit relative to said base unit; and
   wherein each of said positioning sets has two slots that are spaced apart from each other in a left-right direction, said actuating member having an operating part that is pivotally mounted to said button unit, and two fastening parts that extend from said operating part, that extend away from each other and that respectively and separably engage said slots of the selected one of said positioning sets, said fastening unit further including a restoring member that is connected between said fastening parts and said button unit, said restoring member constantly providing a restoring force for said fastening parts to move toward said slots.

2. The computer mouse as claimed in claim 1, wherein said slots are arc-shaped and substantially extend in a front-rear direction, said operating part of said actuating member being pivotally connected to said button unit about an axis that extends in the left-right direction, and being able to be pulled to drive said fastening parts to move forwardly so that said fastening parts are disengaged from said slots.

3. The computer mouse as claimed in claim 2, wherein said fastening unit further includes a strut assembly that is disposed between said base unit and said button unit, said strut assembly being telescopic and resiliently biasing said base unit and said button unit away from each other.

4. The computer mouse as claimed in claim 3, wherein said base unit includes a bottom wall and a surrounding wall that extends upwardly from said bottom wall, a front part of said surrounding wall being provided with two pivoting protrusions that are spaced apart from each other and that are arranged in the left-right direction, said button unit including a mounting base that is mounted to said surrounding wall, said mounting base being provided with two pivoting grooves that are pivotally connected to said pivoting protrusions so that said mounting base can pivot relative to said base unit.

5. The computer mouse as claimed in claim 4, further comprising a supporting unit that is disposed on said base unit and that is located at the rear part of said button unit, said supporting unit being pivotally connected to said button unit about another axis that extends in the left-right direction so that said supporting unit can synchronously move with said button unit substantially in the up-down direction, said support unit including a sliding member that extends toward said bottom wall of said base unit.

6. The computer mouse as claimed in claim 5, wherein said sliding member of said supporting unit has two sliding grooves that substantially extend in the front-rear direction, said base unit further including a connecting member that is mounted to said bottom wall and that extends toward said supporting unit, said connecting member having two protrusions that extend away from each other, and that respectively and slidably engage said sliding grooves of said sliding member.

7. The computer mouse as claimed in claim 3, wherein said strut assembly includes a mounted tube that is mounted to said base unit, a moving rod that is telescopically connected to said mounted tube, and an elastic member that has two opposite ends respectively connected to said mounted tube and said moving rod, said elastic member resiliently biasing said moving rod to move substantially upwardly from said mounted tube so that said moving rod resiliently biases said button unit away from said base unit.

8. The computer mouse as claimed in claim 7, wherein said base unit includes a bottom wall and a surrounding wall that extends upwardly from said bottom wall, a front part of said surrounding wall being provided with two pivoting protrusions that are spaced apart from each other and that are arranged in the left-right direction, said button unit including a mounting base that is mounted to said surrounding wall, said mounting base being provided with two pivoting grooves that are pivotally connected to said pivoting protrusions so that said mounting base can pivot relative to said base unit.

9. The computer mouse as claimed in claim 8, further comprising a supporting unit that is disposed on said base unit and that is located at the rear part of said button unit, said supporting unit being pivotally connected to said button unit about another axis that extends in the left-right direction so that said supporting unit can synchronously move with said button unit substantially in the up-down direction; said support unit including a sliding member that extends toward said bottom wall of said base unit.

10. The computer mouse as claimed in claim 9, wherein said sliding member of said supporting unit has two sliding grooves that substantially extend in the front-rear direction, said base unit further including a connecting member that is mounted to said bottom wall and that extends toward said supporting unit, said connecting member having two protrusions that extend away from each other, and that respectively and slidably engage said sliding grooves of said sliding member.

* * * * *